(12) United States Patent
Jeung et al.

(10) Patent No.: US 12,444,801 B2
(45) Date of Patent: Oct. 14, 2025

(54) BATTERY PACK ASSEMBLY SYSTEM AND BATTERY PACK ASSEMBLY METHOD USING THE SAME

(71) Applicant: LG ENERGY SOLUTION, LTD., Seoul (KR)

(72) Inventors: Seok Won Jeung, Daejeon (KR); Geon Tae Park, Daejeon (KR); Choon Kwon Kang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 428 days.

(21) Appl. No.: 17/921,859

(22) PCT Filed: Aug. 30, 2021

(86) PCT No.: PCT/KR2021/011605
§ 371 (c)(1),
(2) Date: Oct. 27, 2022

(87) PCT Pub. No.: WO2022/050645
PCT Pub. Date: Mar. 10, 2022

(65) Prior Publication Data
US 2023/0170569 A1 Jun. 1, 2023

(30) Foreign Application Priority Data
Sep. 4, 2020 (KR) .................. 10-2020-0113155

(51) Int. Cl.
*H01M 50/244* (2021.01)
*H01M 10/04* (2006.01)
(Continued)

(52) U.S. Cl.
CPC ..... *H01M 50/244* (2021.01); *H01M 10/0404* (2013.01); *H01M 10/6551* (2015.04); *H01M 50/213* (2021.01)

(58) Field of Classification Search
CPC .................. H01M 50/244; H01M 10/0404
See application file for complete search history.

(56) References Cited

U.S. PATENT DOCUMENTS

2012/0133371 A1   5/2012   Toomre et al.
2016/0301045 A1   10/2016  Tyler et al.
(Continued)

FOREIGN PATENT DOCUMENTS

CN   107925022 A   4/2018
CN   207320240 U   5/2018
(Continued)

OTHER PUBLICATIONS

Machine translation CN209526168U (Year: 2018).*
(Continued)

*Primary Examiner* — Abbas Rashid
*Assistant Examiner* — Wayne K. Swier
(74) *Attorney, Agent, or Firm* — Birch, Stewart, Kolasch & Birch, LLP (57) ABSTRACT

Discussed is a battery pack assembly system including a battery cell supplier configured to supply a plurality of battery cells in an aligned state, a robot arm configured to move the plurality of battery cells, a plasma treater configured to treat the plurality of battery cells with plasma, and an assembler in which a battery pack case configured to receive the plurality of battery cells therein is disposed, whereby it is possible to obtain an excellent plasma effect for the plurality of battery cells and to easily assemble a battery pack, and a battery pack assembly method using the same.

15 Claims, 6 Drawing Sheets

(51) Int. Cl.
  *H01M 10/6551* (2014.01)
  *H01M 50/213* (2021.01)

(56) References Cited

U.S. PATENT DOCUMENTS

| | | |
|---|---|---|
| 2016/0301046 A1 | 10/2016 | Tyler et al. |
| 2016/0301117 A1 | 10/2016 | Tyler et al. |
| 2016/0322679 A1 | 11/2016 | Landerer et al. |
| 2018/0323415 A1 | 11/2018 | Lee et al. |
| 2019/0088910 A1* | 3/2019 | Kiemstedt ........... H01M 50/267 |
| 2019/0259987 A1 | 8/2019 | Tate |
| 2019/0386269 A1 | 12/2019 | Taylor et al. |
| 2020/0259141 A1 | 8/2020 | Hawwa et al. |
| 2020/0295325 A1 | 9/2020 | Tyler et al. |
| 2020/0388805 A1 | 12/2020 | Yoo et al. |
| 2021/0249710 A1 | 8/2021 | Kimura et al. |
| 2021/0257648 A1 | 8/2021 | Jeung et al. |

FOREIGN PATENT DOCUMENTS

| | | | |
|---|---|---|---|
| CN | 108767150 A | 11/2018 | |
| CN | 110048151 A | 7/2019 | |
| CN | 209364638 U | 9/2019 | |
| CN | 209526168 U | 10/2019 | |
| CN | 110649309 A | 1/2020 | |
| CN | 110931838 A | 3/2020 | |
| EP | 3532855 B1 * | 9/2020 | .......... H01M 10/482 |
| EP | 4 177 995 A1 | 5/2023 | |
| JP | 08-300286 A * | 11/1996 | .............. B25J 15/08 |
| JP | 2019-145396 A | 8/2019 | |
| JP | 2019-160741 A | 9/2019 | |
| JP | 2021-523027 A | 9/2021 | |
| KR | 10-0141645 B1 | 3/1998 | |
| KR | 10-2008-0036676 A | 4/2008 | |
| KR | 20150037315 A * | 4/2015 | .......... H01M 10/052 |
| KR | 10-1670362 B1 | 10/2016 | |
| KR | 10-2018-0083209 A | 7/2018 | |
| KR | 10-1977639 B1 | 5/2019 | |
| KR | 10-1984889 B1 | 5/2019 | |
| KR | 102037841 B1 * | 10/2019 | .............. H01M 2/36 |
| KR | 10-2020-0030964 A | 3/2020 | |
| KR | 10-2020-0050777 A | 5/2020 | |
| WO | WO 2016/167873 A1 | 10/2016 | |
| WO | WO-2018176137 A1 * | 10/2018 | .......... H02K 41/031 |
| WO | WO 2020/027299 A1 | 2/2020 | |
| WO | WO 2020/091240 A1 | 5/2020 | |

OTHER PUBLICATIONS

Machine translation JPH08300286A (Year: 1996).*
Machine translation KR20150037315A (Year: 2015).*
Machine translation KR102037841B1 (Year: 2019).*
Machine translation EP3532855B1 (Year: 2020).*
International Search Report (PCT/ISA/210) issued in PCT/KR2021/011605, dated Dec. 7, 2021.
Extended European Search Report for European Application No. 21864605.7, dated Jan. 3, 2024.

* cited by examiner

BATTERY PACK ASSEMBLY SYSTEM AND BATTERY PACK ASSEMBLY METHOD USING THE SAME

TECHNICAL FIELD

This application claims the benefit of priority to Korean Patent Application No. 2020-0113155 filed on Sep. 4, 2020, the disclosure of which is incorporated herein by reference in its entirety.

The present invention relates to a battery pack assembly system and a battery pack assembly method using the same, and more particularly to a battery pack assembly system that performs plasma treatment in order to increase force of coupling between a battery pack and a heat sink and a battery pack assembly method using the same.

BACKGROUND ART

A secondary battery, which is capable of being repeatedly charged and discharged, has an advantage in that lifespan of a battery cell is long, and is used in a form in which the secondary battery is detachably attached to a device or is built in a device. The kinds of devices using the secondary battery as an energy source have increased.

In particular, a lithium secondary battery, which is charged and discharged as the result of movement of lithium ions, has been used not only in the field of a small-sized battery cell, which is used for mobile devices or small-sized electronic products, but also in the field of a medium- or large-sized battery pack, which is used as an energy source of an electric vehicle or a power storage system that requires high output and high voltage, since the lithium secondary battery has advantages of high energy density and discharge voltage.

Based on the shape of a battery case, the lithium secondary battery is classified as a cylindrical secondary battery having an electrode assembly mounted in a cylindrical metal can, a prismatic secondary battery having an electrode assembly mounted in a prismatic metal can, or a pouch-shaped secondary battery having an electrode assembly mounted in a pouch-shaped case made of an aluminum laminate sheet. Thereamong, the cylindrical secondary battery has advantages in that the capacity of the cylindrical secondary battery is relatively large and in that the cylindrical secondary battery is structurally stable.

In order to manufacture a battery pack including the cylindrical secondary battery as a unit cell, a process of disposing a plurality of cylindrical battery cells in a battery pack case in a compact state, adding a heat dissipation member, such as a heat sink, and hermetically sealing the battery pack case may be performed.

In order to increase force of adhesion between the heat sink and the plurality of battery cells, an adhesive is applied therebetween. In order to increase adhesive force of the adhesive, surfaces of the heat sink and the battery cells at which the heat sink and the battery cells are adhered to each other may be treated with plasma.

Figure 1:
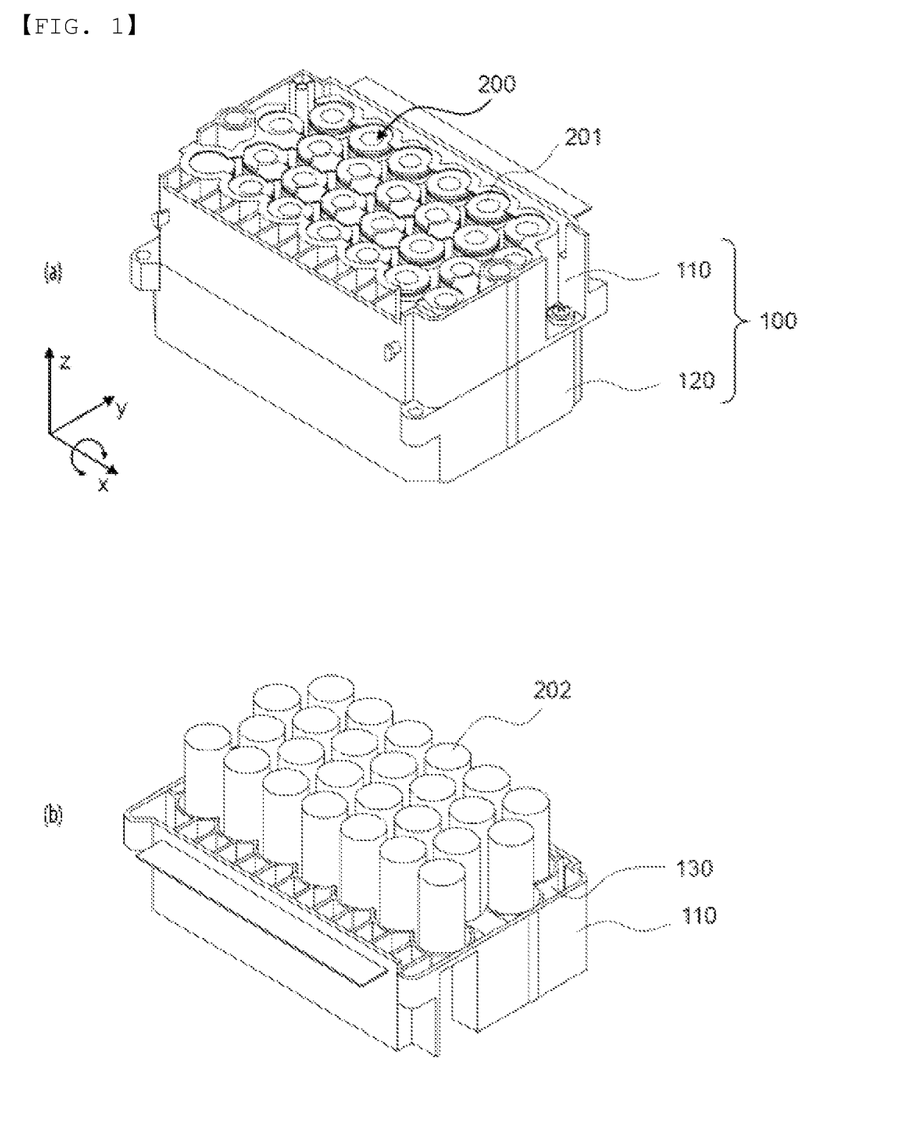
FIG. 1 is a perspective view showing a process of treating the bottom surfaces of conventional cylindrical battery cells with plasma.

In connection therewith, FIG. 1 is a perspective view showing a process of treating the bottom surfaces of conventional cylindrical battery cells with plasma.

Referring to FIG. 1, a battery pack case 100 includes an upper case 110 and a lower case 120, and a plurality of battery cells 200 is disposed in the battery pack case 100 at predetermined intervals.

A frame 130 configured to stably fix the battery cells 200 may be added to the interior of each of the upper case 110 and the lower case 120.

The plurality of battery cells 200 is disposed such that the upper surfaces 201 thereof face upwards in the state in which the upper case 110 and the lower case 120 are coupled to each other. In order to treat the lower surfaces 202 of the plurality of battery cells 200 with plasma, a battery pack is rotated 180 degrees based on an x-axis, and then the lower case 120 is removed such that the lower surfaces 202 of the plurality of battery cells 200 are exposed.

In this state, the lower surfaces 202 of the plurality of battery cells 200 are treated with plasma, the lower case 120 is added again, and the battery pack is rotated 180 degrees based on the x-axis so as to be returned to the original state thereof.

In the case in which the lower surfaces of the battery cells are treated with plasma using the above method, the process of mounting the battery cells in the battery pack case and then rotating the battery pack, and the process of removing and mounting the upper case are required, which complicates the overall process.

Also, in plasma treatment, a plasma treatment effect greatly varies depending on the distance between a target and a plasma device. For this reason, it is necessary to maintain a uniform distance. In the above process, however, it is difficult to maintain a uniform distance between the target and the plasma device.

Therefore, there is a high necessity for a battery pack assembly system capable of simply performing plasma treatment for a plurality of battery cells, thereby improving productivity and consistently achieving a plasma treatment effect.

DISCLOSURE

Technical Problem

The present invention has been made in view of the above problems, and it is an object of the present invention to provide a battery pack assembly system configured such that bottoms of a plurality of battery cells are treated with plasma in the state in which the plurality of battery cells is aligned so as to be disposed side by side, whereby a plasma treatment effect for the plurality of battery cells is consistently and excellently exhibited, and a battery pack assembly method using the same.

Technical Solution

In order to accomplish the above object, a battery pack assembly system according to the present invention includes a battery cell supplier configured to supply a plurality of battery cells in an aligned state, a robot arm configured to move the plurality of battery cells, a plasma treater configured to treat the plurality of battery cells with plasma, and an assembler in which a battery pack case configured to receive the plurality of battery cells therein is disposed.

The battery pack assembly system according to the present invention may further include a heat sink disposed in the battery pack case.

In the battery pack assembly system according to the present invention, an adhesive may be applied to a first surface of the heat sink.

In the battery pack assembly system according to the present invention, the adhesive may be applied to the first surface of the heat sink on the first surface of the heat sink which is treated with the plasma.

In the battery pack assembly system according to the present invention, the robot arm may be controlled such that a plasma treatment is performed as the plurality of battery cells are disposed above the plasma treater and spaced apart from the plasma treater by a predetermined distance.

In the battery pack assembly system according to the present invention, the predetermined distance may be 1 mm.

In the battery pack assembly system according to the present invention, the plasma treater may be disposed between the battery cell supplier and the assembler.

In the battery pack assembly system according to the present invention, the robot arm may include a gripper configured to hold or release the plurality of battery cells.

In the battery pack assembly system according to the present invention, a frame member may be mounted in the battery pack case, and the plurality of battery cells may be disposed at the frame member.

In addition, the present invention provides a battery pack assembly method using the battery pack assembly system. Specifically, the battery pack assembly method includes aligning the plurality of battery cells in the battery cell supplier, transferring the plurality of battery cells to the plasma treater by holding the plurality of battery cells, treating the plurality of battery cells with the plasma, and disposing the plurality of battery cells that have been treated with plasma in the battery pack case.

In the battery pack assembly method according to the present invention, the distance between the plurality of battery cells and the plasma treater may be uniform.

The battery pack assembly method according to the present invention may further include preparing a heat sink to be disposed in the battery pack case, treating a first surface of the heat sink with the plasma, and applying an adhesive to the first surface of the heat sink treated with the plasma.

Advantageous Effects

As is apparent from the above description, a battery pack assembly system according to the present invention is capable of supplying a plurality of battery cells in an aligned state and moving the plurality of battery cells in the state in which the aligned state of the plurality of battery cells is maintained using a robot arm, whereby it is possible to treat the battery cells with plasma in the state in which the battery cells are aligned.

Consequently, it is possible to maintain a uniform distance between a plasma treatment unit and the bottoms of the battery cells, whereby it is possible to obtain a uniform plasma treatment effect.

In addition, it is possible to secure conditions in which the plasma treatment effect can be maximally obtained, whereby it is possible to remarkably increase adhesive force of an adhesive.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

In addition, all numeric ranges include the lowest value, the highest value, and all intermediate values therebetween unless the context clearly indicates otherwise.

Embodiments of the present invention will be described in detail with reference to the accompanying drawings.

Figure 2:
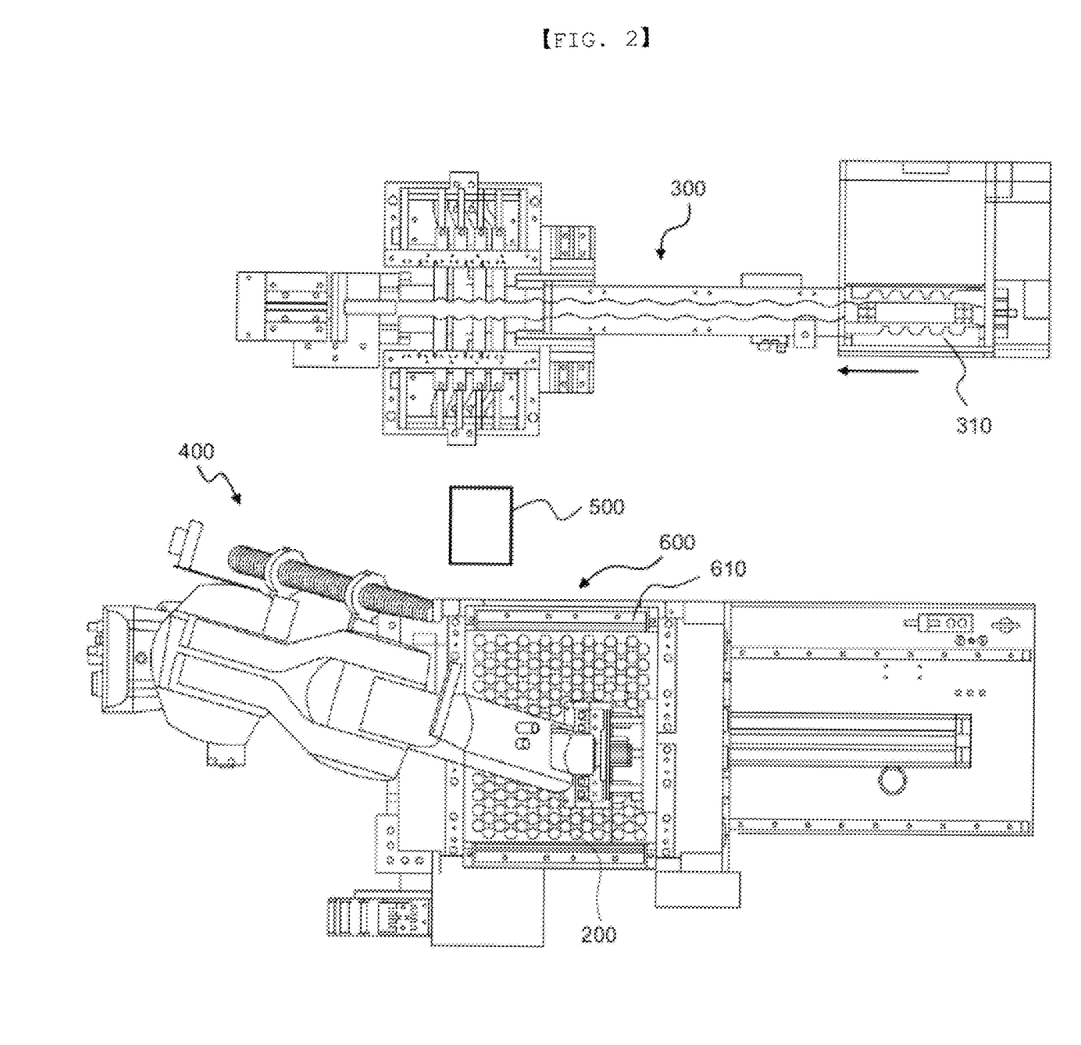
FIG. 2 is a plan view of a battery pack assembly system according to the present invention.

FIG. 2 is a plan view of a battery pack assembly system according to the present invention.

Referring to FIG. 2, the battery pack assembly system according to the present invention includes a battery cell supply unit 300 configured to supply a plurality of battery cells in an aligned state, a robot arm 400 configured to move the plurality of battery cells, a plasma treatment unit 500 configured to treat the plurality of battery cells with plasma, and an assembly unit 600 in which a battery pack case 610 configured to receive the plurality of battery cells therein is disposed.

The battery pack assembly system according to the present invention, which is used to receive the plurality of battery cells in the battery pack case in order to assemble a battery pack, is characterized in that the battery pack assembly system includes a plasma treatment unit configured to reform lower surfaces of the plurality of battery cells in order to improve adhesiveness of an adhesive used to fix the plurality of battery cells.

Plasma treatment for the lower surfaces of the plurality of battery cells may be performed in the state in which the robot arm 400 grips the plurality of battery cells. In order to rapidly perform plasma treatment for the battery cells and the assembly process of the battery pack, the plasma treatment unit 500 may be disposed on a path along which the battery cells supplied from the battery cell supply unit 300 are transferred to the assembly unit 600.

That is, the plasma treatment unit 500 may be disposed between the battery cell supply unit 300 and the assembly unit 600.

The assembly unit 600 may include a transfer means configured to transfer the battery pack case 610 such that the battery pack case 610 is located adjacent to the robot arm 400.

For example, a conveyor belt or a rail may be used as the transfer means.

In a concrete example, an adhesive is applied to the inner surface of the lower surface of the battery pack case, in which the battery cells are mounted, and the lower surface of the battery pack case and the battery cells are coupled to each other via the adhesive.

In order to increase adhesive force of the adhesive, the lower surface of the battery pack case is treated with plasma, and the adhesive is applied to the lower surface of the battery pack case. In addition, the lower surfaces of the battery cells may be treated with plasma. That is, the inner surface of the battery pack case and the lower surfaces of the battery cells that abut each other via the adhesive may be reformed so as to be hydrophilic, whereby adhesiveness of the adhesive may be improved.

For example, each of the battery cells may be a cylindrical battery cell.

The battery pack case may include an upper case and a lower case having similar heights. Alternatively, the battery case may include a case body, constituted by a lower surface and four side surface, and a case cover.

The battery cell supply unit 300 includes a mounting portion 310, in which the plurality of battery cells is mounted in an aligned state, the bottom of the mounting portion being flat. Consequently, the plurality of battery cells may be aligned such that no difference in height therebetween occurs.

Subsequently, the mounting portion 310 moves in a direction indicated by an arrow so as to be located adjacent to the robot arm 400 in the state in which the battery cells are mounted therein.

The robot arm 400 transfers the battery cells aligned in the mounting portion 310 to above the plasma treatment unit 500 in a state of gripping the battery cells without change. At this time, alignment of the battery cells is maintained. Consequently, it is possible to maintain a uniform distance between the bottoms of the battery cells and a plasma device.

A frame member may be mounted in the battery pack case, and the plurality of battery cells may be disposed at the frame member. Consequently, it is possible to stably fix the plurality of battery cells.

Figure 3:
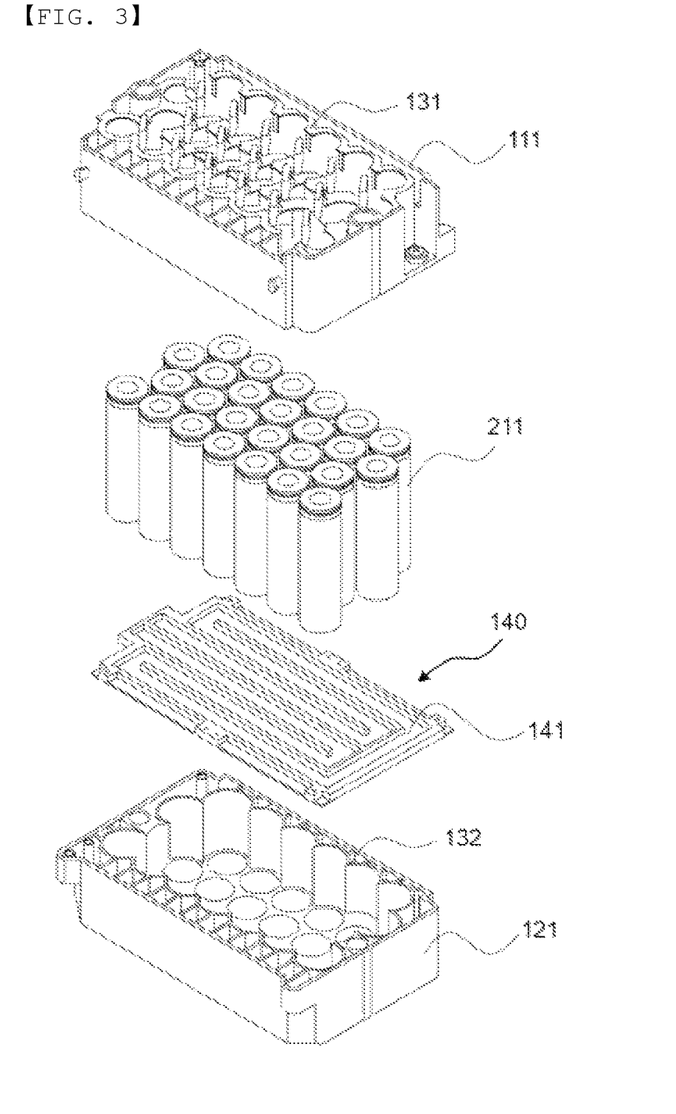
FIG. 3 is an exploded perspective view of a battery pack according to the present invention.

In another concrete example, FIG. 3 is an exploded perspective view of a battery pack according to the present invention.

Referring to FIG. 3, the battery pack includes an upper case 111 and a lower case 121, and frame members 131 and 132 configured to stably mount battery cells 211 are disposed inside the upper case 111 and the lower case 121, respectively.

The battery pack of FIG. 3 further includes a heat sink 140 in order to secure rapid heat dissipation of thermal energy generated from the plurality of battery cells 211.

The heat sink 140 may be disposed between the inner surface of the lower surface of the lower case 121 and the battery cells 211. For stable mounting of the battery cells in this structure, it is preferable for an adhesive to be applied between the heat sink 140 and the lower surfaces of the battery cells 211. The adhesive may be applied to a first surface 141 of the heat sink 140, at which the battery cells 211 are disposed.

At this time, in order to increase force of adhesion of the adhesive to the first surface 141 of the heat sink, the adhesive may be applied to the first surface 141 of the heat sink in the state in which the first surface is treated with plasma.

Figure 4:
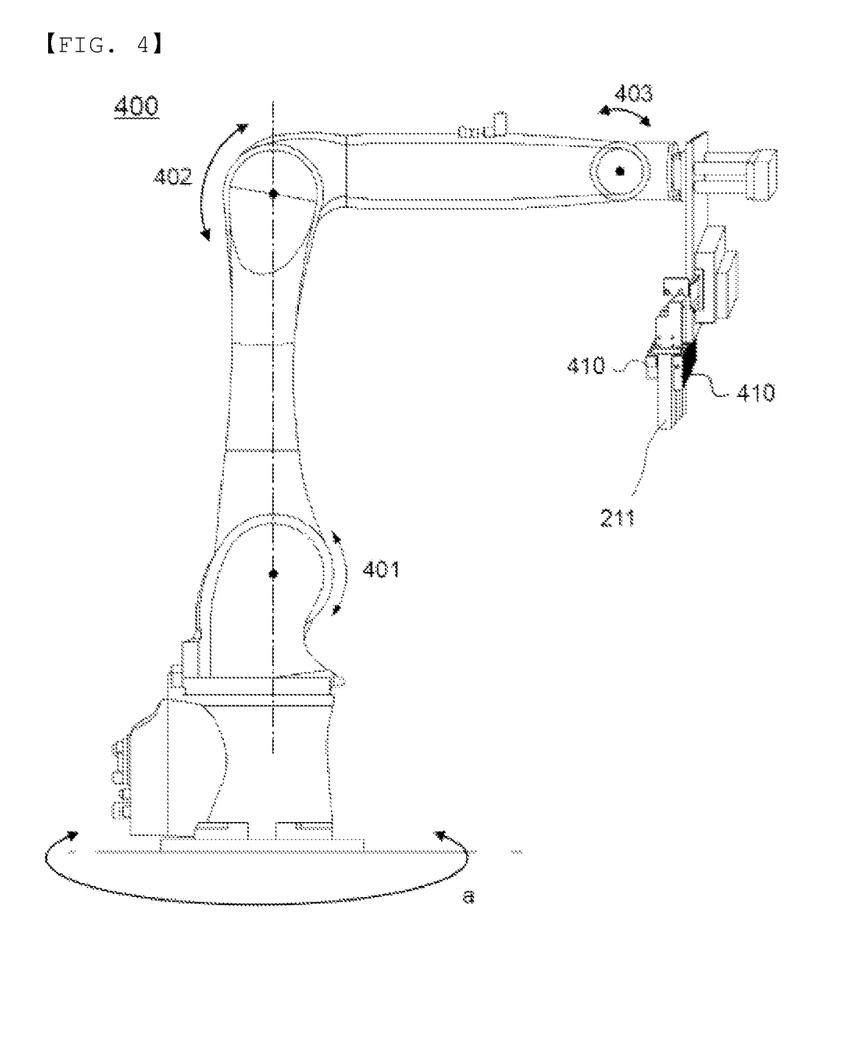
FIG. 4 is a side view of a robot arm of FIG. 2.

FIG. 4 is a side view of the robot arm of FIG. 2.

Referring to FIG. 4, the robot arm 400 is configured to be rotatable on the ground in direction a, and includes three rotatable articulation structures 401, 402, and 403.

In addition, the robot arm 400 includes a gripper 410 configured to hold or put down the plurality of battery cells 211.

Consequently, the robot arm may perform a process of moving to the plasma treatment unit in a state of holding the plurality of battery cells 211 supplied from the battery cell supply unit while the articulation structures 401, 402, and 403 are unfolded or folded and mounting the battery cells 211 in the battery pack case after plasma treatment.

In addition, the robot arm 400 may be controlled such that plasma treatment is performed in the state in which the plurality of battery cells 211 is disposed above the plasma treatment unit so as to be spaced apart from the plasma treatment unit by a predetermined distance.

Consequently, all of the battery cells transferred by the robot arm are treated with plasma in a state of being uniformly spaced apart from the plasma device, whereby all of the battery cells may be reformed to the same level.

Figure 5:
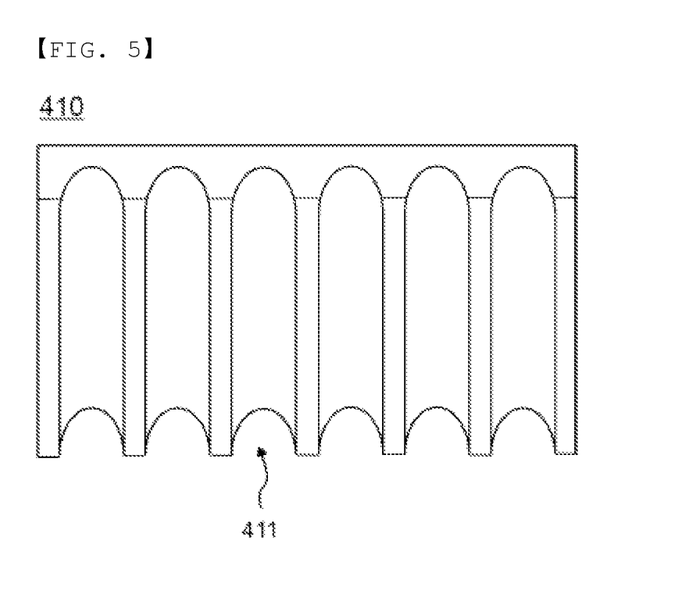
FIG. 5 is a front view of a gripper.

FIG. 5 is a front view of the gripper.

Referring to FIG. 5, there is shown one of two grippers 410 configured to wrap side surfaces of cylindrical battery cells, wherein the gripper is configured to wrap about 50% of the side surface of each of the cylindrical battery cells.

The gripper 410 is provided with recesses 411 corresponding respectively to the side surfaces of the cylindrical battery cells such that the cylindrical battery cells can be stably mounted.

The outer surface of each of the recesses 411 may be anti-slip treated in order to prevent slip of a corresponding one of the cylindrical battery cells.

Alternatively, the gripper 410 may be configured to perform vacuum suctioning in order to stably fix the cylindrical battery cells while maintaining the aligned state thereof.

Figure 6:
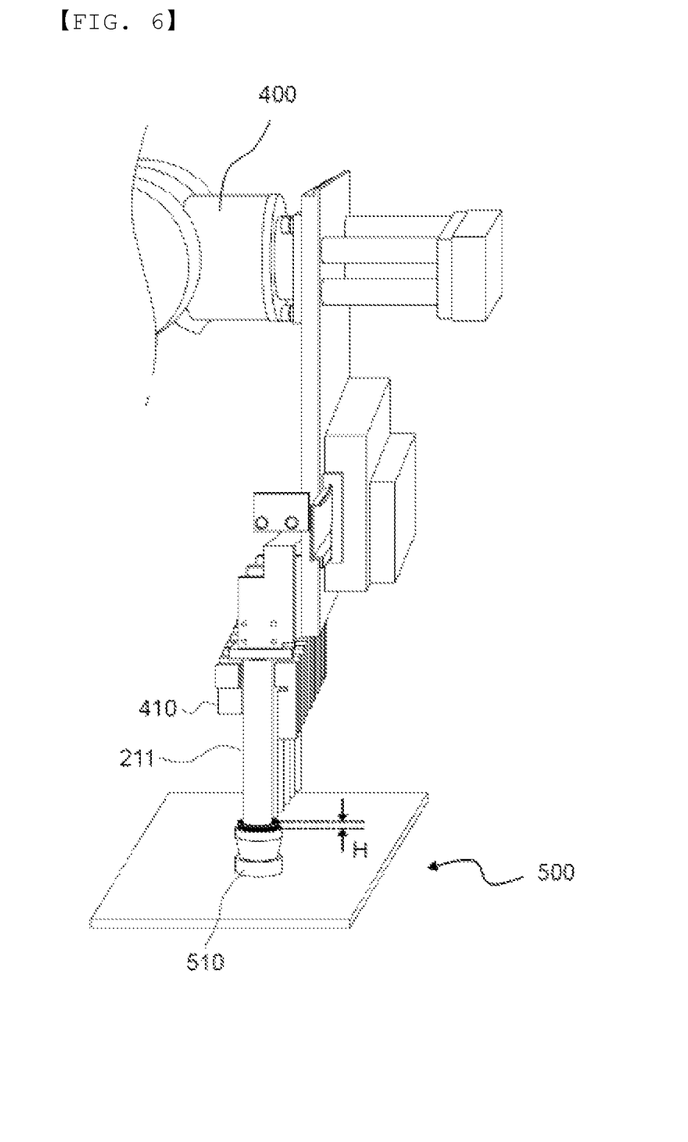
FIG. 6 is a perspective view showing plasma treatment.

FIG. 6 is a perspective view showing plasma treatment.

Referring to FIG. 6, the battery cells 211 are moved to the plasma treatment unit 500 in a state of being mounted at the gripper 410, and are stopped above the plasma device 510.

The effect of plasma treatment is affected by the distance H between the plasma device 510 and the lower surfaces of the battery cells 211. In order to achieve the same plasma effect for all of the battery cells, the distance H must be maintained uniform.

In the case in which the battery pack assembly system according to the present invention is used, the battery cells are transferred using the robot arm, which is capable of performing accurate and minute control, and therefore it is possible to achieve a uniform plasma treatment effect for all of the battery cells.

That is, in the case in which the robot arm 400 is used, it is possible to maintain the distance H uniform. For example, the distance H may be 1 mm.

A battery pack assembly method using the battery pack assembly system may include (a) a step of aligning a plurality of battery cells in the battery cell supply unit, (b) a step of transferring the plurality of battery cells to the plasma treatment unit in a state of holding the plurality of battery cells, (c) a step of treating the plurality of battery cells with plasma, and (d) a step of disposing the plurality of battery cells of step (c) in the battery pack case.

At this time, the distance between the plurality of battery cells and the plasma treater may be maintained uniform.

Also, in the case in which the battery pack includes a heat sink, the battery pack assembly method may further include a step of treating a first surface of the heat sink, on which the battery cells are disposed, with plasma and a step of applying an adhesive to the first surface treated with plasma, in order to increase adhesive force of an adhesive added between the heat sink and the battery cells.

Hereinafter, the present invention will be described with reference to the following example, which is provided for easier understanding of the present invention, and the category of the present invention is not limited thereto.

Example

A heat sink to be disposed in a battery pack case was prepared, and a first surface of the heat sink was treated with plasma.

An adhesive was applied to the first surface of the heat sink treated with plasma in order to increase force of adhesion of the adhesive to the heat sink.

A plurality of battery cells was supplied to the battery cell supply unit in an aligned state using the battery pack assembly system shown in FIG. 2, and the plurality of battery cells was transferred to the plasma treatment unit using the robot arm. Setting was performed such that the distance between the bottom surfaces of the plurality of battery cells and the plasma device was 1 mm, and the bottom surfaces of the plurality of battery cells were treated with plasma.

The plurality of battery cells treated with plasma as described above was disposed on the adhesive applied to the first surface of the heat sink.

The plasma treatment was performed using a 3D+iZET from Applied Plasma Inc.

Comparative Example

A heat sink to be disposed in a battery pack case was prepared, and an adhesive was applied to a first surface of the heat sink.

A plurality of battery cells was supplied to the battery cell supply unit in an aligned state using the battery pack assembly system shown in FIG. 2, and the plurality of battery cells was transferred and disposed on the adhesive applied to the first surface of the heat sink using the robot arm.

In order to check adhesive force of the battery cells mounted in the battery pack case for each of Example and Comparative Example, tensile force when each individual battery cell was separated from the heat sink was measured. The results are shown in Table 1 below.

TABLE 1

| | Tensile force (kgf) |
|---|---|
| Example | 186.6 |
| Comparative Example | 99.6 |

Referring to Table 1 above, it can be seen that the tensile force of Example, in which plasma treatment was performed, was about 87% higher than the tensile force of Comparative Example, in which no plasma treatment was performed.

In particular, it can be seen that, when plasma treatment is performed in the state in which the distance between the plasma device and the bottom surfaces of the plurality of battery cells is maintained at 1 mm, as in Example, it is possible to obtain a remarkable effect of increasing adhesive force.

Those skilled in the art to which the present invention pertains will appreciate that various applications and modifications are possible within the category of the present invention based on the above description.

DESCRIPTION OF REFERENCE SYMBOLS

100: Battery pack case
110, 111: Upper cases
120, 121: Lower cases
130: Frame
131, 132: Frame members
140: Heat sink
141: First surface
200, 211: Battery cells
201: Upper surface
202: Lower surface
300: Battery cell supply unit
310: Mounting portion
400: Robot arm
401, 402, 403: Articulation structures
410: Gripper
411: Recesses
500: Plasma treater
510: Plasma device
600: Assembly unit
610: Battery pack case
H: Distance between plasma device and lower surfaces of battery cells

INDUSTRIAL APPLICABILITY

As is apparent from the above description, a battery pack assembly system according to the present invention is capable of supplying a plurality of battery cells in an aligned state and moving the plurality of battery cells in the state in which the aligned state of the plurality of battery cells is maintained using a robot arm, whereby it is possible to treat the battery cells with plasma in the state in which the battery cells are aligned.

Consequently, it is possible to maintain a uniform distance between a plasma treatment unit and the bottoms of the battery cells, whereby it is possible to obtain a uniform plasma treatment effect.

In addition, it is possible to secure conditions in which the plasma treatment effect can be maximally obtained, whereby it is possible to remarkably increase adhesive force of an adhesive.

The invention claimed is:

1. A battery pack assembly system comprising:
    a battery cell supplier configured to supply a plurality of battery cells in an aligned state;
    a robot arm configured to move the plurality of battery cells;
    a plasma treater configured to treat the plurality of battery cells with plasma; and
    an assembler in which a battery pack case configured to receive the plurality of battery cells therein is disposed, wherein the robot arm comprises a gripper configured to hold or release the plurality of battery cells, wherein the gripper is configured to wrap about 50% of a side surface of each of the plurality of battery cells, and wherein the gripper performs vacuum suctioning to hold each of the plurality of battery cells.

2. The battery pack assembly system according to claim 1, further comprising a heat sink disposed in the battery pack case.

3. The battery pack assembly system according to claim 2, wherein an adhesive is applied to a first surface of the heat sink.

4. The battery pack assembly system according to claim 3, wherein the adhesive is applied to the first surface of the heat sink on the first surface of the heat sink which is treated with the plasma.

5. The battery pack assembly system according to claim 1, wherein the robot arm is controlled such that a plasma treatment is performed as the plurality of battery cells are disposed above the plasma treater and spaced apart from the plasma treater by a predetermined distance.

6. The battery pack assembly system according to claim 5, wherein the predetermined distance is 1 mm.

7. The battery pack assembly system according to claim 1, wherein the plasma treater is disposed between the battery cell supplier and the assembler.

8. The battery pack assembly system according to claim 1, wherein a frame member is mounted in the battery pack case, and wherein the plurality of battery cells are disposed at the frame member.

9. A battery pack assembly method using the battery pack assembly system according to claim 1, the battery pack assembly method comprising:

aligning the plurality of battery cells in the battery cell supplier;

transferring the plurality of battery cells to the plasma treater by holding the plurality of battery cells;

treating the plurality of battery cells with the plasma; and disposing the plurality of battery cells that have been treated with plasma in the battery pack case.

10. The battery pack assembly method according to claim 9, wherein a distance between the plurality of battery cells and the plasma treater is uniform in the treating of the plurality of battery cells with the plasma.

11. The battery pack assembly method according to claim 9, further comprising:

preparing a heat sink to be disposed in the battery pack case;

treating a first surface of the heat sink with the plasma; and applying an adhesive to the first surface of the heat sink treated with the plasma.

12. The battery pack assembly method according to claim 9, wherein an alignment of the plurality of battery cells from the aligning of the plurality of battery cells in the battery cell supplier is maintained while the plurality of battery cells are transferred to the plasma treater.

13. The battery pack assembly system according to claim 1, wherein the robot arm maintains the aligned state of the plurality of battery cells while the plurality of battery cells are moved to the plasma treater, and to the assembler.

14. The battery pack assembly system according to claim 1, wherein the assembler includes one of a conveyor and a rail.

15. The battery pack assembly system according to claim 1, wherein the assembler is configured to move the battery pack case closer to and farther from the robot arm along in a first direction, and wherein the assembler is arranged parallel to a battery supplier in the first direction and separated from the battery supplier in a second direction perpendicular to the first direction.

\* \* \* \* \*